United States Patent

Lejon

[15] 3,694,633
[45] Sept. 26, 1972

[54] ARRANGEMENT FOR BUMPLESS TRANSFER OF A CONTROL SYSTEM FROM ONE MODE TO ANOTHER

[72] Inventor: Jean C. Lejon, Paris, France

[73] Assignee: Controle Bailey (Societe Anonyme), Clamart, France

[22] Filed: Oct. 7, 1970

[21] Appl. No.: 78,845

[30] Foreign Application Priority Data

Oct. 8, 1969   France.......................6934402

[52] U.S. Cl................................235/151.1, 318/591
[51] Int. Cl...............................................G05b 7/00
[58] Field of Search.....................235/151.1; 318/591

[56] References Cited

UNITED STATES PATENTS 3,044,002   7/1962   Lejon....................318/591 X

Primary Examiner—Eugene G. Botz
Attorney—Joseph M. Maguire

[57] ABSTRACT

A bumpless transfer process control having three states of operation, namely a digital control state, an analog control state and a manual control state. The control includes an operational amplifier which produces an analog control signal of the process and includes a first and a second feedback capacitor. A switch operates so that the first capacitor is used as storage for the first and third states of operation and the second capacitor is used as an integrator in the second state. In each state of operation the unused capacitor constantly receives a voltage which charges it to a vlaue which enables it to be used abruptly at any time without producing a surge in the amplifier output signal.

4 Claims, 3 Drawing Figures

ARRANGEMENT FOR BUMPLESS TRANSFER OF A CONTROL SYSTEM FROM ONE MODE TO ANOTHER

This invention relates to a process control system comprising a plurality of classes or states of operation, more particularly a system having three states of operation, namely a digital control state, a second purely analog control state, and a third manual control state, the first and third states of operation being of either the incremental or absolute control type, and each control channel having a section common to the three states of operation.

In known systems of this type a number of solutions have been proposed to ensure that any switching from one state of operation to another does not result in a surge of the output voltage of the amplifier which produces the analog control signal.

In one such solution, when the changeover is made from the first state of operation to the second, the proportional-action (and possibly derivative-action) input analog signal which should be applied to the amplifier is first cancelled and then restored progressively. Of course such solutions solve the problem only very imperfectly.

Another solution consists in applying to the amplifier an auxiliary analog signal which scans the field of variation of the output signal and, using a deviation detector, changing from the first state of operation to the second only at the exact moment when the output analog signal is equal to that achieved by the first state of operation. Of course this solution is relatively complex and requires an amplitude comparator.

This invention is intended to obviate these difficulties.

To this end, according to the invention, a process control system of the above type is characterized in that the operational amplifier which produces the analog control signal of the process is associated with a first and a second feedback capacitor. Sets of switching contacts are arranged firstly so that the first capacitor is used as a store in the first and third states of operation and the second capacitor is used as an integrator in the second state of operation, and secondly so that in each state of operation the unused capacitor constantly receives a voltage which charges it to a value which enables it to be used abruptly at any time without producing a surge of the amplifier output signal.

The invention will be more readily understood from the following description of two exemplified embodiments and the accompanying drawings wherein.

Figure 1:
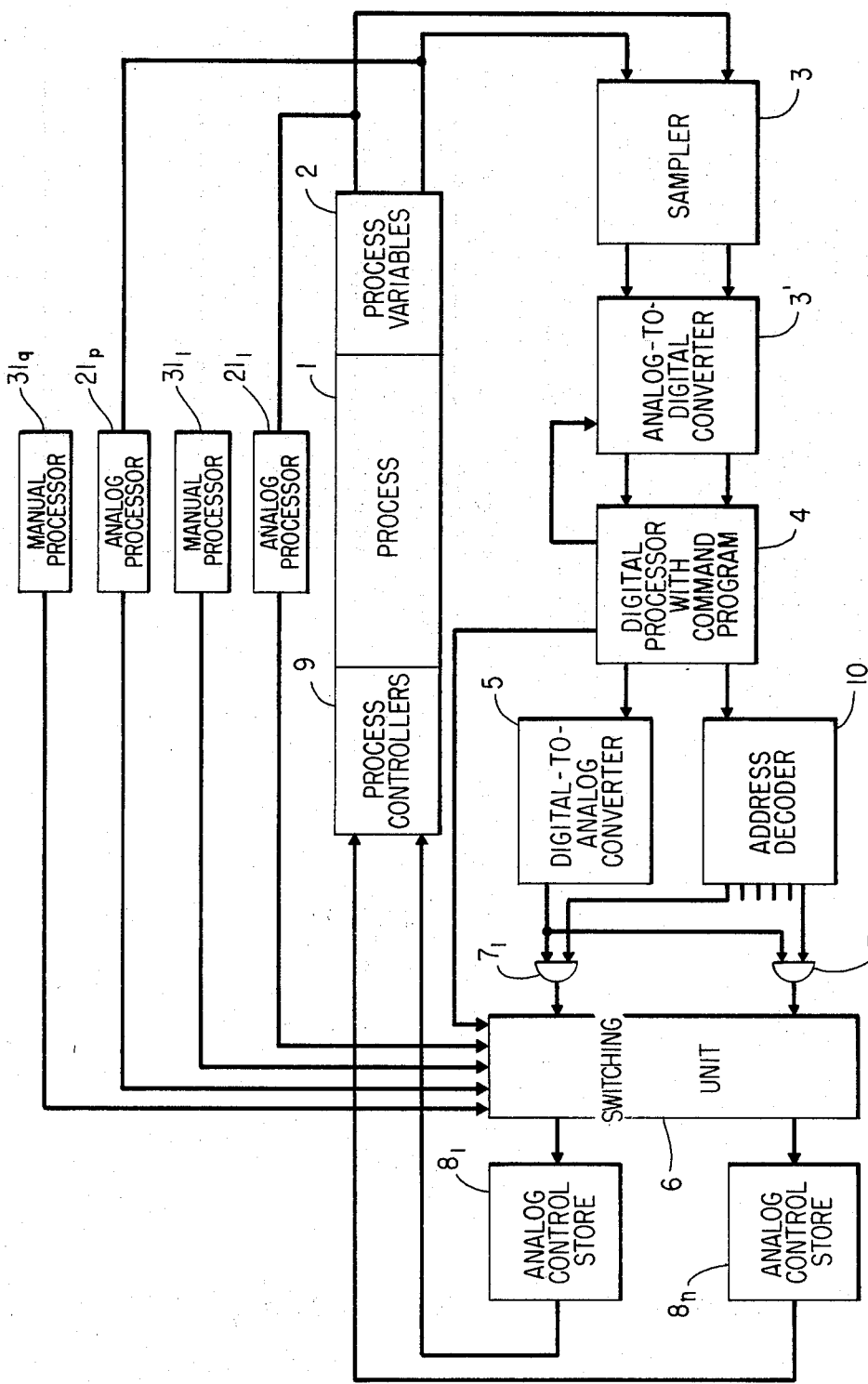
FIG. 1 is a block diagram of a process control system according to the invention.

Referring to FIG. 1 of the accompanying drawings, a process to be controlled 1 which, for example, consists of a steam generator, is provided with a group 2 of means for measuring or testing output variables, e.g. for measuring the steam temperature, steam output, smoke temperature, and so on. These measuring means transmit analog measurement signals to a sampler 3, which is followed by an analog-to-digital converter 3', the output of which delivers digital measurement signals corresponding to the analog signals. A digital processor 4 with a command program stores these digital measurement signals and process them as required in order sequentially to prepare $n$ digital control signals intended, for example, to control the rate of flow of the feed water, the rate of injection of de-superheating water, the rate of flow of fuel, the rate of flow of air, and so on, the digital control signals being fed over $n$ control channels.

Each of the digital control signals consists, firstly, of magnitude and sign bits, and secondly an address which identifies the corresponding control channel.

The various digital control signals are transmitted sequentially from a single common digital-to-analog converter 5 to analog control stores $8_1$ to $8_n$ and they are routed by an address decoder 10 which selectively controls input gates $7_1$–$7_n$ of the control channels respectively connected to these stores. The various analog control signals thus received by the analog control stores $8_1$–$8_n$ are transmitted respectively to the process control unit 9 of the controlled process 1.

In the case when they receive incremental signals (see FIG. 2) each of the analog stores 8 consists, in known manner, of a high-insulation, e.g., mylar or polycarbonate, storage capacitor 81 associated with an operational amplifier 80. The latter is of the high-gain type with a very high input impedance. The capacitor 81 is connected between the output of the amplifier 80 and the inverting input (marked $-$ in FIG. 2) thereof, while the direct input of the amplifier (marked $+$ in the figure) is grounded so that the system forms an integrating circuit.

The differential voltage at the input to the amplifier 80 (output voltage divided by the gain) is very low and may be disregarded. Consequently, the inverting input may be considered as being at the same potential as the direct input, i.e., zero potential, and the voltage at the terminals of the capacitor 81 is substantially equal to the output voltage of the amplifier 80, i.e., $V_s$. Since the input current of the amplifier 80 is very low, the voltage at the terminals of the capacitor 81 remains practically constant, i.e., the output voltage $V_s$ does not normally vary. The unit acts as an analog store for a voltage $V_s$.

The incremental control of this store comprises varying the voltage $V_s$ by an increment $\Delta V_s$ on each digital processor 4 scanning cycle, a charge increment $\Delta Q = C_n \Delta V_s$ being transmitted to the storage capacitor 81, the magnitude and sign of said charge increment being determined by the computer and $C_n$ denoting the capacity of the storage capacitor 81.

The incremental control device for each store 8 is a gate 7 (FIG. 1) which under the control of the address decoder 10 transfers to the capacitor 81 charge increments $\Delta Q$ which are representative of the increments which are to be stored and which originate from the digital-to-analog converter 5.

The digital and analog combined control system described above is completed by two auxiliary control systems, one of which is a purely analog system and the other a manual system.

The process variables are processed by the analog processors of a group $21_1 - 21_p$ to form control signals, each of said processors using an analog variable delivered by one of the measuring members of the group 2 and controlling one of the process controllers of the group 9, e.g. by using the measurement of the steam temperature to control the rate of injection of de-superheating water. Each of the analog processors 21 consists essentially in known manner (see left-hand part of FIG. 2) of an operational amplifier 22, the two inputs of which receive a process variable and a reference signal respectively, a proportional-action operational amplifier 23, possibly a derivative-action operational amplifier 24, a changeover switch 25 for selection of the direction of action (direct or inverse- D-I respectively in FIG. 2), depending upon whether the output control signal is an increasing or decreasing function of the input test variable. This group continuously delivers at the output of the amplifier 23 a voltage signal hereinafter referred to as $V_{p+d}$ (although the proportional action $p$ may or may not be corrected by a derivation action $d$).

When the auxiliary analog processor is in operation, the voltage $V_{p+d}$ is applied to the direct input of the said differential amplifier 80, while the said storage capacitor 81 is grounded and replaced by an integration capacitor 82 connected between the output of the amplifier 80 and the inverting input thereof; the capacitor 82 is also grounded through a variable resistor 84 which enables the integration time constant to be adjusted.

The operational amplifier 80 then operates as an integrator, so that the output voltage $V_s$ is equal to the input voltage $V_{p+d}$ corrected by an integral term $V_i$ represented by the voltage at the terminals of the capacitor 82.

The switching over between digital operation and auxiliary analog operation is carried out by a relay 61 whose winding 610 is energized in digital operation from a voltage source 62 by a contact 63 which is kept closed by the digital processor 4 (FIG. 1). Relay 61 has four contacts 611–614 which provide the connections required respectively between the direct input of the amplifier 80, the storage capacitor 81, the inverting input of the amplifier 80 and the integration capacitor 82. When relay 61 is operative, the four contacts 611–614 are connected to the terminals $N_1$–$N_4$ respectively while when the relay 61 is inoperative they are connected to the terminals $A_1$–$A_4$. Terminal $N_1$ is grounded, terminals $N_2$ and $N_3$ are connected to a transfer gate 7 and terminal $N_4$ is connected to the output of the amplifier 23 of the auxiliary analog processor 21. Terminal $A_1$ is also connected to the output of the same amplifier 23, terminal $A_2$ is grounded, terminal $A_3$ is connected to the capacitor 82 and to the variable resistor 84 and terminal $A_4$ is unconnected.

Operation for the digital and analog combined and analog states and for switching from one state to the other is as follows :

It has already been indicated that the storage capacitor 81 and the integration capacitor 82 are both permanently connected to the output of the amplifier 80 each via a first plate and that the capacitor 82 is connected by its second plate through a variable resistor 84 connected to ground.

Figure 2:
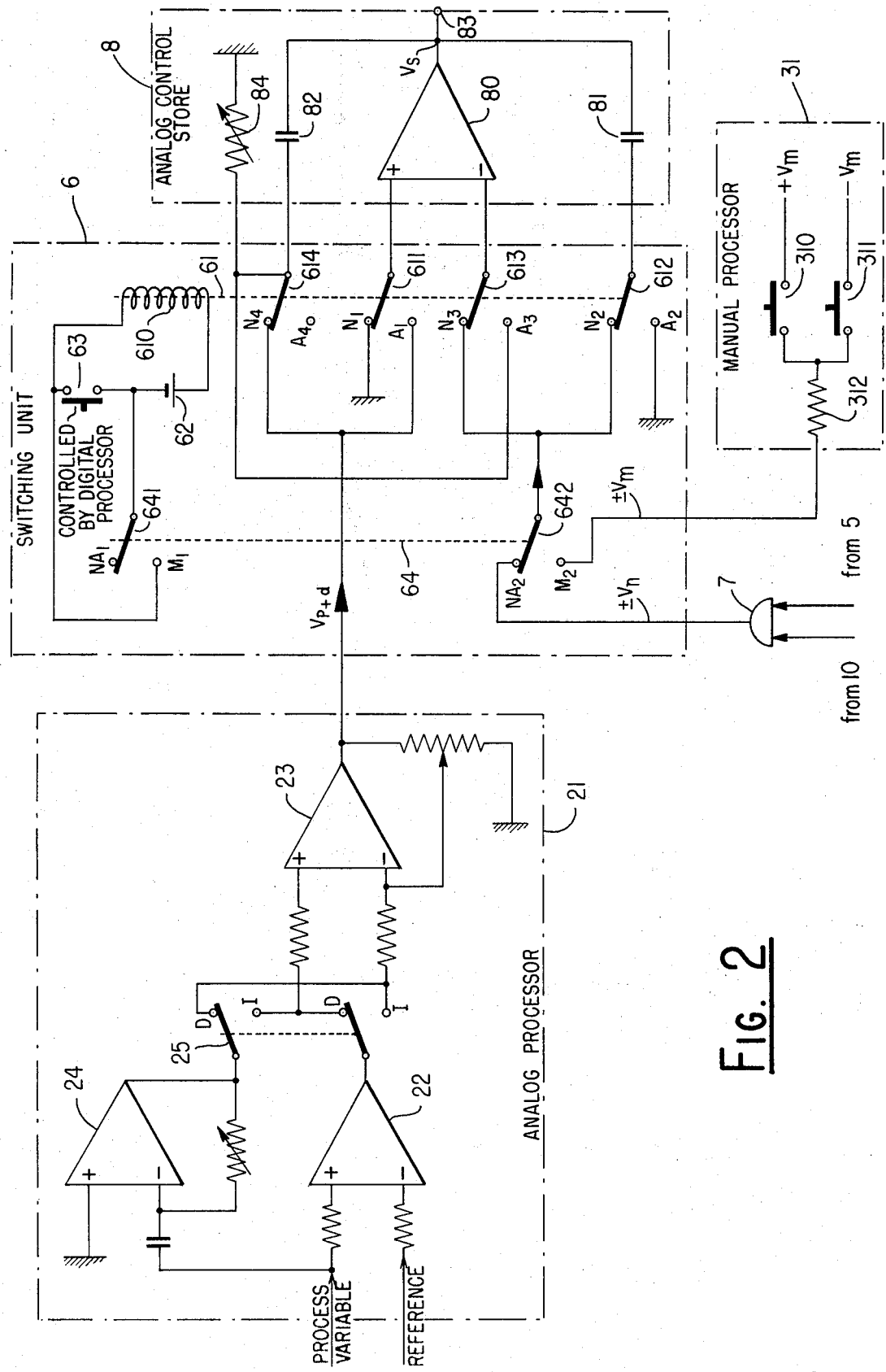
FIG. 2 is a detailed diagram of the control system according to the invention showing the section of the control channel common to digital, analog and manual states of operation in the case where the digital and manual control systems are of the incremental type.

In digital operation, the digital processor 4 operating normally holds the relay 61 in the operative state so that the four contacts 611–614 of this relay are in the positions respectively marked $N_1$–$N_4$ in FIG. 2.

The direct input of amplifier 80 is grounded via 611. The storage capacitor 81 is connected via 612 to the transfer gate 7 so as to receive the charge increments determined by the digital-to-analog converter 5 and consequently modify the output voltage of the amplifier 80. The inverting input of the amplifier 80 is connected via 612 and 613 to the capacitor 81 so as to receive therefrom a negative feedback voltage. Capacitor 82 is connected via 614 to the output of amplifier 23 which continuously delivers a proportional and possibly a proportional and derivative analog voltage $V_{p+d}$, so that during digital operation the capacitor 82 is kept charged at a voltage whose instantaneous value is $V_s-V_{p+d}$.

It will now be assumed that during a cyclic self-checking test, there occurs a digital processor failure; it then passes an order for changing from the digital state to the analog state by cutting-off the energizing current of the relay 61 so that the four contacts 611–614 of this relay drop back to their inoperative positions respectively marked $A_1$–$A_4$ in FIG. 2.

From then on, the direct input of the amplifier 80 is connected via 611 to the output of the amplifier 23 and its potential changes from zero to $+V_{p+d}$. Capacitor 82 charged as indicated above to a voltage $V_s-V_{p+d}$ is disconnected via 614 from the output of amplifier 23. The inverting input of amplifier 80 is connected via 613 to capacitor 82 and its potential changes from zero to $+V_{p+a9}$. Consequently, the gap between the potentials of the two inputs of the amplifier remains unchanged and hence the output voltage $V_s$ does not undergo any surge. Finally, capacitor 81 is connected via 612 to ground so that during analog operation the capacitor 81 is kept charged at a voltage whose instantaneous value is $V_s$.

It will finally be assumed that the computer has been restored to operation and the contact 63 has closed again either through the agency of the computer or manually. Relay 61 is re-energized and the four contacts 611–614 of this relay return to their operative positions $N_1$–$N_4$.

From then on, the amplifier 80 and its associated circuit are in the state already indicated. At the moment of changeover the direct input and inverting input of the amplifier both change potential from $+V_{p+d}$ to zero. As a result, the gap between the potentials of the two inputs of the amplifier remains unchanged so the output voltage $V_s$ does not experience any surge.

Manual control signals are prepared, if required, by manual processors of a group $31_1$–$31_q$ (FIG. 1) each actuating a process controller of the group 9. Each of the manual processors 31 consists essentially in known manner (see bottom and right-hand part of FIG. 2) of two contactors 310, 311 connected, firstly, to two voltage sources $+V_m$, $-V_m$ respectively, and adapted to be connected, secondly, through a common resistor 312, to the capacitor 81 and to the inverting input of the amplifier 80. The contactors 310, 311 are each provided with a press-button automatically returning to the inoperative state. If required, an operator can close either of the contactors 310, 311 for a time $t$ so that a current I, whose direction depends on the contactor selected, charges or discharges the capacitor 81 by a required increment $\Delta Q = It$.

The switching operations between the numerical or analog state and the manual state are carried out by a manual changeover switch 64 having two contacts 641, 642.

In digital or analog operation, the two contacts 641, 642 are in the positions marked $NA_1$, $NA_2$ respectively in FIG. 2. The operation is then one of the two described hereinbefore. In manual operation, the two contacts 641, 642 are in the positions marked $M_1$, $M_2$ respectively in FIG. 2. Operation is then as follows.

Whether the contact 63 controlled by the digital processor 4 is open or closed, it is shunted by the contact 641 so that the relay 61 is energized and the contacts 611–614 thereof are connected to their terminals N. The contact 642 now connects the storage capacitor 81 and the inverting input of the amplifier 80 via the contacts 612 and 613 to the manual processor 31 instead of the transfer gate 7.

It will readily be seen that the switching operations between digital and analog combined operation and manual operation are carried out without any surge of the output voltage $V_s$ because in either the manual or the digital case the capacitor associated with the amplifier 80 is the storage capacitor 81; the switching operations between manual and analog states are in every respect comparable to those described between digital and analog operation, because the changeover operations carried out by the contacts of the relay 61 are the same.

Referring to FIG. 1 the switching devices 61-64 are combined in a single digital-analog-manual switching unit 6.

Referring to FIG. 2, the positions marked $N_i$ of the contacts of the relay 61 are common to the two digital and manual states, the incremental control voltage $\pm V_n$ (digital case) or $\pm V_m$ (manual case) being applied in either case to the inverting input of the amplifier 80 and to one of the plates of the storage capacitor 81.

Figure 3:
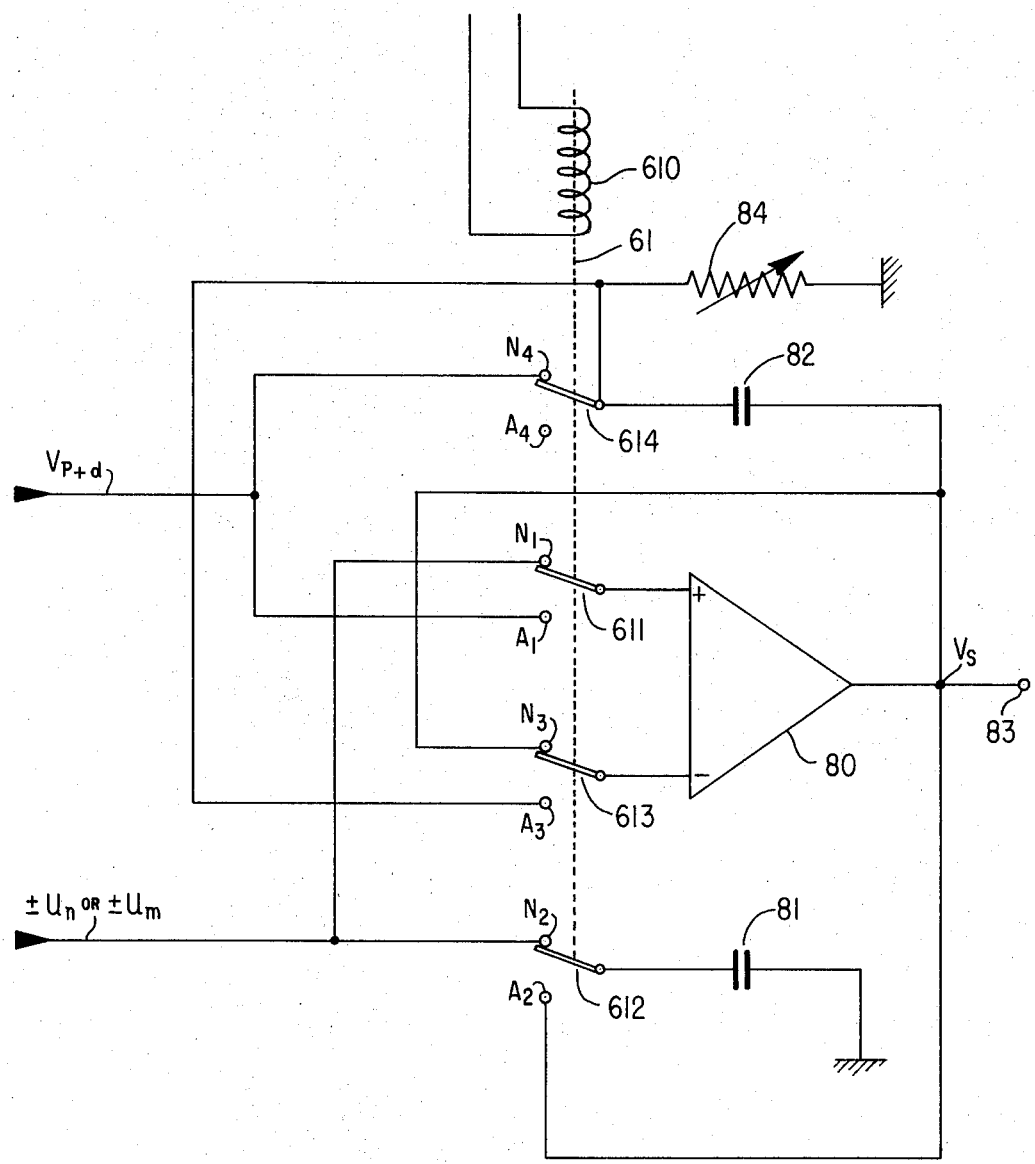
FIG. 3 is a partial diagram of the control system according to the invention showing how the circuit of FIG. 2 is modified in the case where the digital and manual control systems are of the absolute magnitude type.

If the analog control stores $8_1$ to $8_n$ receive absolute signals instead of incremental signals the diagram shown in FIG. 2 is modified to that shown in FIG. 3.

In the digital and manual states of operation, the absolute control voltage $U_n$ or $U_m$ is applied simultaneously to the direct input of the amplifier 80 and to one of the plates of the storage capacitor 81, the other plate of which is grounded, while the inverting input of the same amplifier 80 is connected directly to the output of the amplifier. The capacitor 82 has the same connections as in the preceding case.

In analog operation, all the connections are similar to those of the preceding case.

The contacts of the relay 61 have their terminals modified as a result.

The type of operation is quite similar to that already described.

What I claim is:

1. A process control system employing process test variables and process controllers said system comprising:

a. a digital control path including means for sampling the process test variables, means for converting the samples of the process test variables into process test digital signals, processor means for forming from said process test digital signals digital control signals and means for converting said digital control signals into analog incremental control signals;

b. an analog control path including comparator means for comparing said process test variables to reference signals and forming analog error signals;

c. a set of storing and integrating circuits comprising an operational amplifier with a direct and an inverting input, a storage capacitor and an integrating capacitor each having a terminal connected to the output of said amplifier, said storage and integrating circuits being respectively connected to said process controllers; and d. switching means for changing over the digital and analog paths, said switching means in one position comprising means for connecting the analog incremental control signals to the inverting input of said operational amplifier, the other terminal of the storage capacitor to the inverting input of said amplifier, grounding the direct input of said amplifier and connecting the integrating capacitor to the output of the comparator means; and in a second position comprising means for connecting the output of the comparator to the direct input of the operational amplifier, connecting the integrating capacitor to the inverting input of the operational amplifier and grounding the storage capacitor.

2. A process control system as set forth in claim 1 including:

a manual control path having a voltage source connected by contactors; and switching means for changing control of the process to said manual path wherein said digital and analog switching means are switched to said first mentioned position and said manual voltage source is connected to the inverting input of said operational amplifier and said storage capacitor while said analog incremental signal is disconnected.

3. A process control system as set forth in claim 2 wherein said manual switching means and said digital and analog switching means comprise a switching unit connected between said converting means and said storing and integrating circuits.

4. A shockless process control system for witching between a fixed value digital-manual common control path and an analog control path, comprising:

an operational amplifier having an inverting input, an output and a direct input adapted for connection to said digital-manual common control path and said analog control path;

a switching array with a plurality of contacts capable of being switched from a first position to a second position;

an integrating capacitor connected between the output of said operational amplifier and said analog control path while the output of said operational amplifier is connected to its inverting input corresponding to a first contact position and said integrating capacitor is connected between the output and the inverting input of said operational amplifier corresponding to a second contact position;

a storage capacitor connected between ground and the input of said digital-manual common control path while said common control path is also connected to the direct input of said operational amplifier corresponding to a first contact position and said storage capacitor connected between ground and the output of said operational amplifier while the direct input of said operational amplifier is connected to said analog control path corresponding to a second contact position; and, means for switching said contactor array between said first and second contact positions to provide a shockless transfer between said digital-manual common path and said analog path in either direction.

* * * * *